Jan. 3, 1956   R. HOOPER   2,728,981
METHOD OF MAKING ATOMIZERS
Filed June 7, 1950   2 Sheets-Sheet 1
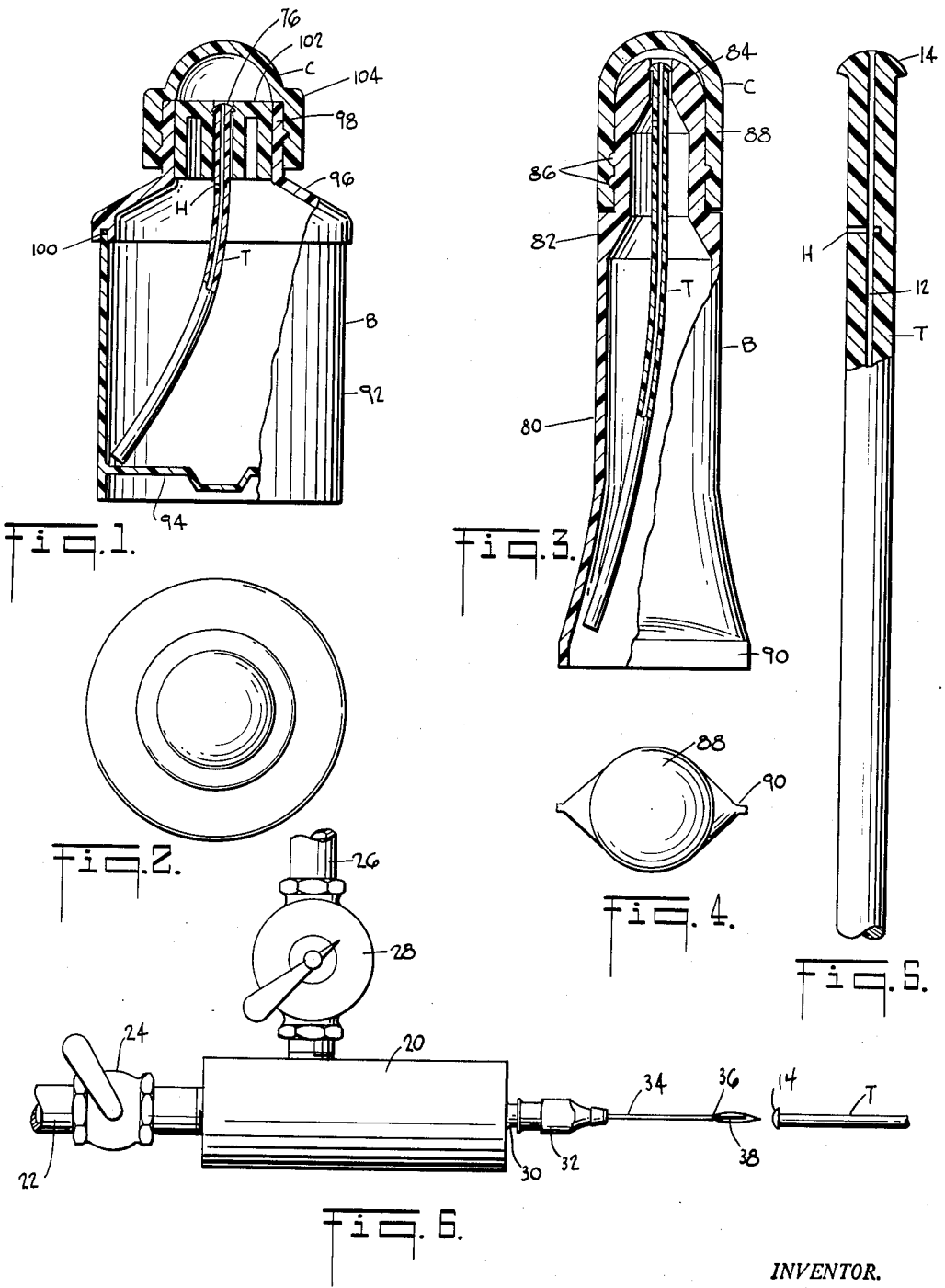
INVENTOR.
ROBERT HOOPER
BY James and Franklin
ATTORNEYS Jan. 3, 1956
R. HOOPER
2,728,981
METHOD OF MAKING ATOMIZERS
Filed June 7, 1950
2 Sheets-Sheet 2
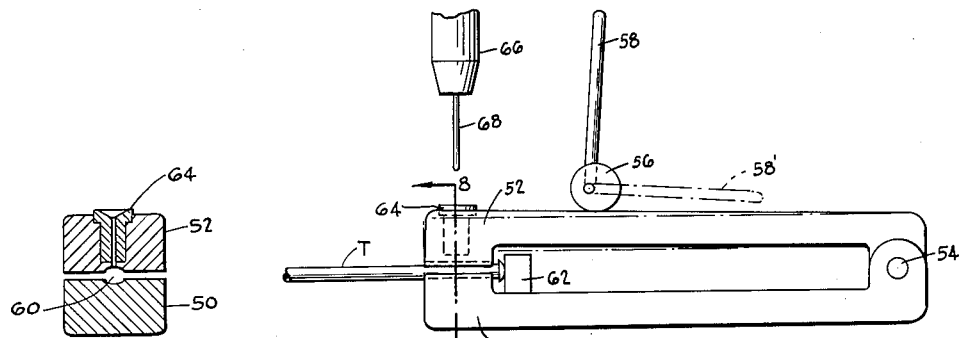
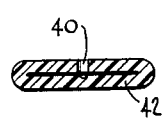
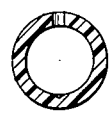
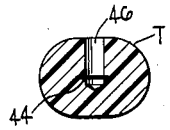
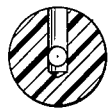
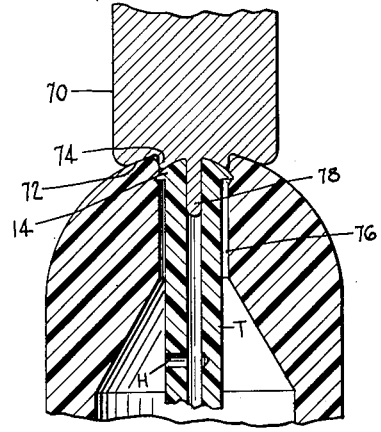
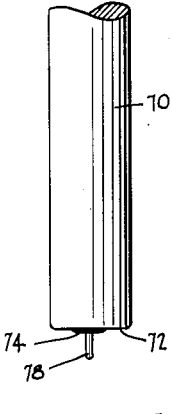
INVENTOR.
ROBERT HOOPER
BY *James and Franklin*
ATTORNEYS

2,728,981
METHOD OF MAKING ATOMIZERS

Robert Hooper, Towaco, N. J., assignor, by mesne assignments, to Boonton Molding Company, Boonton, N. J., a limited partnership Application June 7, 1950, Serial No. 166,613

1 Claim. (Cl. 29—525)

This invention relates to a method of making atomizers, and more particularly to miniature plastic atomizers.

Miniature atomizers made of a moldable plastic have considerable utility. The container may be made of a flexible plastic, thus enabling it to act as its own bellows. It may be pocketed and thus kept conveniently available for use as a nasal spray. Such containers may also be employed to atomize deodorant liquids, anti-perspiration liquids, and for numerous other purposes.

The primary object of the present invention is to generally improve atomizers of this general character. A more particular object is to make possible the manufacture of such atomizers at exceedingly low cost, so that they may be discarded after using the contents, as is done with tooth paste containers or the like. A still further object is to make possible the use of polyethylene, for this material is tough and elastic and well suited for the desired bellows action, and it is so resistant to chemical attack that it may be used with substantially all known medicines and chemicals. However, the material has the disadvantage that it cannot be cemented as can most plastics. In accordance with the present invention polyethylene, as well as any other known suitable plastic, may be employed. The structure is simplified by requiring the assembly of only two main parts—an outer container, and an extruded tube, and by a few inexpensive changes the tube is made to embody the desired atomizer mechanism and is prepared for ready assembly with the outer container.

To accomplish the foregoing general objects, and other more specific objects which will hereinafter appear, my invention resides in the atomizer elements and their manufacture, as are more particularly described in the following specification. The specification is accompanied by drawings, in which:

Fig. 1 is a partially sectioned elevation of a plastic atomizer bottle embodying features of my invention;

Fig. 2 is a plan view thereof;

Fig. 3 is a partially sectioned elevation of a plastic atomizer in the form of a collapsible tube;

Fig. 4 is a plan view thereof;

Fig. 5 is a partially sectioned elevation drawn to enlarged scale of a very slender atomizer tube or capillary tube forming an important part of the invention;

Fig. 6 is an elevation schematically illustrating a preferred method of enlarging the end of the atomizer tube;

Fig. 7 schematically illustrates a preferred method of forming an air hole in the tube;

Fig. 8 is a transverse section taken approximately in the plane of the line 8—8 of Fig. 7, with the tube removed;

Figs. 9 through 12 are transverse sections through a tube at the air hole and are explanatory of the method of forming the air hole;

Fig. 13 is a fragmentary section drawn to enlarged scale to illustrate a method of assembling the atomizer tube with the container; and Fig. 14 is an elevation of the end of a tool employed in Fig. 13.

Referring to the drawing, and more particularly to Figs. 1 and 3, in both forms of the invention shown the atomizer comprises a flexible outer container or bellows B having a hole at the top, and a slender tube T in the container with its upper end secured in the hole, the said tube having a transverse air hole H near its upper end below the top of the container. In the forms shown the container or body B is flexible enough to act as the bellows of the atomzer, and only the container and tube are needed. For convenience and sanitation the neck of the container is preferably surmounted by a cap C. This minimizes evaporation when the atomizer is not in use.

A most important part of the atomizer is the tube T, and a portion of this tube is drawn to enlarged scale in Fig. 5. Referring to that figure, the tube is preferably an inexpensive extruded plastic tube, and a preferred material is polyethylene, although other flexible plastics may be employed. The specific tube here illustrated has an outside diameter of $3/32''$, and the bore or passage 12 therethrough is quite small compared to the diameter of the tube, it being in this case .010". The continuous extruded tubing is cut into short lengths appropriate for the particular atomizer in which it is to be used, and as will be seen in Figs. 1 and 3, the tube is preferably made long enough to insure drainage of substantially all of the liquid content from the container. Because of its small bore the tube acts as a capillary tube, and tends to draw liquid upwardly into itself. When the bellows is squeezed air rushes through the air hole H and upwardly. The pressure also forces a minute quantity of the liquid upward, which is finely atomized by the rush of air. The very fine bore of the tube is thus useful in insuring thorough atomization of a minute quantity of the liquid, wholly apart from any desired capillary action.

In Fig. 5 it will be seen that the original extruded tube is modified in two respects. One is the production of the air hole H, and the other is an enlargement 14 at the upper end of the tube. This enlargement is important to facilitate assembly of the two main parts of the atomizer. As was previously pointed out, polyethylene, while most desirable in other respects, has the disadvantage that it cannot be cemented. It may be welded, but that would be more troublesome and costly than the method of assembly here adopted, which is to simply force the enlargement into the hole receiving the same. The hole may be given a diameter intermediate that of the tube and its enlargement, and this has the advantage of facilitating easy rapid passage of the tube through the hole until the enlargement is reached, whereupon the enlargement may be forced a short distance into the hole. In the present case the enlargement has a diameter of $5/32''$, which is substantially greater than the tube diameter of $3/32''$.

Fig. 6 illustrates the preferred method of forming the enlargement 14 at the end of tube T. I have discovered that this may be done rapidly and effectively by taking advantage of the relatively high surface tension of the material. More specifically, I have found that the end of the tube may be heated to cause the material to soften and flow, and that the surface tension of the material causes it to assume the desired shape, whereupon the heating of the tube may be terminated. Heating in a gas flame for only one or two seconds is ordinarily sufficient. Naturally the heating cannot be carried on too long because the material will then liquefy, sag and drip. Moreover, the material may oxidize or burn.

An exact figure for the heating time cannot be given because the time will vary with the dimension of the tubing being used; with the size and temperature of the flame used; the temperature of the surrounding air; the distance from the flame, etc.

The difficulty of possible oxidation of the material is preferably avoided by heating the end of the tube in a reducing flame, that is, in a flame having an excess of air or oxygen.

Referring to Fig. 6, I have devised apparatus which includes a mixing chamber 20 to which gas is supplied through a pipe 22 under control of a valve 24. Air is supplied under pressure from a pipe 26, and preferably through a reducing valve 28. The reducing valve is so regulated in relation to the gas supply as to provide the desired reducing atmosphere. The discharge nipple 30 from the mixing chamber 20 is dimensioned to receive the base end 32 of an ordinary hypodermic needle 34. The needle is conventional but is modified by cutting off the point to provide a blunt tip at 36. The fine bore of the needle provides an exceedingly slender pinpoint-like flame 38. Because of the fine bore of the needle there is no danger of the flame travelling back into the mixing chamber.

The end of the tube T is held at the flame 38 for a matter of say two seconds, until the desired degree of enlargement is seen, whereupon it is removed from the flame. The surface tension of the material has the interesting and convenient property of causing the enlargement to assume perfect concentricity relative to the tube. It further guards against closing the fine bore or passage through the tube. It also gives the enlargement a somewhat mushroom-like shape which is strong and suitable for the "force fit" anchorage of the tube, because the thin edge of the enlargement is yieldable, yet also tends to expand and embed itself somewhat into the surrounding wall of the hole.

The other modification of the simple capillary tube is to provide the air hole H. This may be pierced entirely through the tube, thus providing two diametrically opposite air holes, but I have found that for minute discharge there is some advantage in using a single hole. The hole may be made in various ways, but it is important that it be made without any burr, for burr may partially or even wholly obstruct the fine capillary passage through the tube.

I have discovered that a fast, economical and uniform way of making the hole is to drill the same, and that the usual resulting burr may be avoided by utilizing the opposite wall of the tube as a backing surface during the drilling operation. This may be explained with reference to Figs. 9 and 10 of the drawing. These show a tube with a thin wall and a large hole, but that has been done merely to help clarify the method. The tube is preliminarily compressed as shown in Fig. 9 in order to flatten it enough to bring the upper inside wall hard against the lower inside wall. If the tubing is held tightly in this condition and then drilled as indicated by the hole 40, no burr will be formed on the inside of the tube. On releasing the pressure the tube expands back to original cylindrical configuration as shown in Fig. 10.

Figs. 11 and 12 show the parts more nearly in the proportion of the actual tubing here used, although even in these figures the diameter of the bore is somewhat exaggerated in relation to the diameter of the tube. In any case the tube T is first preliminarily compressed or flattened in order to bring one side of the bore hard against the opposite side of the bore, as is indicated at 44 in Fig. 11, whereupon the tube is drilled with a suitably fine drill, as is indicated at 46, the hole being drilled in the direction in which the tube has been compressed, or, in other words, generally perpendicular to the flattened bore indicated at 44. This hole may be drilled entirely through the tube, thus forming a double air hole, or the drilling operation may be interrupted after going through a distance more than one and less than two thicknesses of the wall of the tube, thus producing only a single air hole as shown in the drawing. When the drill is removed and the tube released, it springs back to cylindrical shape as shown at Fig. 12. In the particular case here shown the air hole happens to have the same diameter as the bore of the tube, that is, .010".

To facilitate the drilling operation a suitable drilling jig may be made. This is schematically illustrated in Figs. 7 and 8 of the drawing, referring to which I provide a clamp-like fixture having a lower jaw 50 and an upper jaw 52 which are movable toward or away from one another. A simple pivotal connection may be employed as shown at 54 provided that the pivot is located a substantial distance from the working ends of the jaws. The jaws may be clamped together by suitable means, here illustrated by a cam or eccentric 56 operated by a manually movable lever 58. The jaws are preferably recessed slightly as indicated at 60 in Fig. 8 in order to locate the tube T during the drilling operation. Moreover, a stop block 62 may be fixedly mounted between the jaws, thus locating the axial distance of the hole from the end of the tube. The upper jaw 52 is preferably provided with a hardened steel drill bushing 64, and the entire fixture or jig may be fixedly mounted on the table of a small drill press, the chuck 66 and drill 68 of which are shown in Fig. 7. Most drill presses are provided with a stop block or stop screw arrangement to limit the depth to which the drilling operation is carried, and such a stop means is utilized in the present case, particularly if a single rather than a double air hole is wanted.

To form the air hole it is merely necessary to insert the end of the tube between the jaws as far as the stop block 62; to then swing the clamp lever 58 to the position 58'; and to then lower the drill as far as permitted by its stop.

To assemble the tube with the container and thus complete the atomizer, it is merely necessary to drop the tube through the hole in the top of the container and to then force the enlargement into position. In many cases it is convenient to do this after filling the container with the desired quantity of liquid, the said liquid being filled through the single hole at the top before the atomizer tube is inserted. The method of forcing the tube home is illustrated in Fig. 13. The operator is provided with a small manually operated tool the end of which is shown in elevation in Fig. 14, and a section through which is shown in Fig. 13. This tool comprises a shank 70 terminating in a stop shoulder 72. A stud or pusher plug 74 projects from the tool 70 by the amount which it is desired to insert the enlargement 14 into the hole 76 receiving the same. The tool is preferably further provided with a pin 78 dimensioned to be received in the bore of the tube T. It will be evident from inspection of Fig. 13 that because of the relatively oversized diameter of hole 76, the tube T is readily dropped through the hole as far as the enlargement, whereupon it stops, for the enlargement is larger than the hole. The pin 78 of the tool 70 is passed into the bore of the tube as a guide, and the tool is then pressed downwardly as far as it will go, thus seating the enlargement somewhat into the hole. The amount depends on the stud 74, and is preferably small in order not to collect liquid above the tube. It has been found that the force fit is adequate to hold the parts in secure assembly, and to easily resist any expulsive force which may be developed when squeezing the walls of the container.

The specification has so far purposely refrained from detailed description of the bellows containers. These may vary, but the two containers shown in Figs. 1 and 3 are good examples. The container shown in Fig. 3 and Fig. 4 is molded in a single piece out of polyethylene, and comprises a relatively thin tubular wall 80 surmounted by a rigid molded top 82. This includes a relatively long, somewhat rounded or tapered nozzle portion 84 dimensioned to be inserted in a nostril, the atomizer being used as a nasal inhalent. The lower portion of the nozzle 84 is threaded, as indicated at 86. This thread mates with a thread on the inside of a suitable cap 88. The lower end of the container is sealed by simply compressing the side walls together to form a so-called "fin seal" 90, which is welded by the application of heat.

By filling the container through the top, the container may be made with the fin seal at the bottom before shipment to the user, say a manufacturing drug firm. The capillary or atomizer tubes are shipped separately. The containers are filled through the top hole and are then completed by inserting the atomizer tube, as was described in connection with Fig. 13. This has been found to be an easier and more convenient procedure than to ship the container with the tube inserted but with the container open at the bottom, and to then have the user fill the tube through the bottom, and weld it under heat and pressure to form the fin seal 90. One of the advantages of the present simplified atomizer construction is that it is so easy to assemble the tube into the container, that that may be done by the purchaser as a step in the filling operation.

The flexible container shown in Figs. 1 and 2 is generally cylindrical in shape. It is made of polyethylene. It comprises a side wall 92 molded integrally with a bottom wall 94. A top 96 is separately molded with a threaded neck 98. The top 96 and the side wall 92 are assembled by welding them together in any suitable fashion, preferably by means of a metal ring 100 subjected to electronic heating, and left embedded in the welded material. The hole 76 for receiving the atomizer tube is formed in a reentrant plug 102 which is inserted with a force fit into the neck 98. It should be understood, however, that the part 102 may be molded integrally with the neck 98 if the mold is to be used solely for the atomizer here shown. In the case of the particular bottle illustrated it happens that the same mold is used to make an ordinary bottle as well as an atomizer, and it is therefore preferred to add a separate plug 102 when using the bottle as an atomizer. The top may be closed by an internally threaded cap 104. When the cap is removed the contents may be atomized by squeezing the container. The sides may be squeezed toward one another, or the bottom 94 may be pushed upwardly. In either case the container is elastic and immediately returns to initial condition, thus acting as a good bellows or air pump for atomizing minute quantities of the liquid in the container.

It is believed that the improved atomizer structure and the preferred method of making the same, as well as the many advantages thereof, will be apparent from the foregoing detailed description. It will be understood that the two main operations on the atomizer tube may be performed in either sequence, so that while I have shown the end upset before the drilling operation, it is entirely possible to perform the drilling operation before enlarging the end. It will also be understood that while I have shown my simplified and advantageous atomizer tube added to two types of flexible container, the tube may be added to containers of many other shapes with equal satisfaction. It will therefore be apparent that while I have shown and described the invention in several preferred forms, changes may be made in the structures shown without departing from the spirit of the invention, as sought to be defined in the following claim.

I claim:

In the manufacture of an atomizer having a uniform diameter hole receiving an atomizer tube, the method of facilitating passage of the tube through the hole and of securing the upper end of an inexpensive tube tightly in the hole which includes using a desired length of slender extruded uniform-section polyethylene tube having a diameter appreciably smaller than the hole, preliminarily enlarging the upper end of the tube substantially concentrically of the tube, passing the tube freely through the hole until the enlarged end reaches the hole, and then forcing the enlarged end frictionally into the hole for a short distance.

References Cited in the file of this patent

UNITED STATES PATENTS

| | | |
|---|---|---|
| 644,703 | Buckley | Mar. 6, 1900 |
| 684,909 | Cole | Oct. 22, 1901 |
| 2,115,959 | Lewis | May 3, 1938 |
| 2,187,564 | Bagley | Jan. 16, 1940 |
| 2,209,403 | Kittner et al. | July 30, 1940 |
| 2,276,050 | Leighton | Mar. 10, 1942 |
| 2,286,117 | Sidnell | June 9, 1942 |
| 2,344,803 | Criley | Mar. 21, 1944 |
| 2,347,737 | Fuller | May 2, 1944 |
| 2,388,297 | Slaughter | Nov. 6, 1945 |
| 2,437,884 | Maynard | Mar. 16, 1948 |
| 2,530,934 | Barton | Nov. 15, 1950 |
| 2,531,745 | Schopmeyer | Nov. 28, 1950 |
| 2,658,797 | Montenier | Nov. 10, 1953 |

FOREIGN PATENTS

| | | |
|---|---|---|
| 688,483 | France | May 13, 1930 |